Patented Sept. 10, 1940

2,214,689

UNITED STATES PATENT OFFICE 2,214,689

PROCESS FOR SOFTENING WATERS OF TEMPORARY HARDNESS

Harry Burrell, Bloomfield, N. J., assignor to Ellis-Foster Company, a corporation of New Jersey No Drawing. Application May 8, 1937, Serial No. 141,563

8 Claims. (Cl. 210—24)

This invention relates to the treatment of natural and artificial waters containing metallic and/or bicarbonate ions for the purpose of softening said waters without producing an effluent containing undesirable alkali metal salts.

A specific object of the invention is the removal of calcium and magnesium bicarbonates from naturally occurring waters containing temporary hardness by replacing the compounds by carbonic acid through the medium of an organic ion-exchanging material, which in this case introduces hydrogen ion in place of calcium ion or magnesium ion, into the water.

Another important object is the decomposition of the sodium bicarbonate such as occurs in certain natural waters or in the effluent from a zeolite water-softening apparatus.

An additional purpose of the invention is to provide a ready source of dissolved carbon dioxide for varied industrial uses.

Materials applicable in the present method of water treatment are described in the co-pending applications Serial Numbers 107,359, 115,813, 119,131, and 120,143.

The objections of hard water (i. e., water containing ions which cause the precipitation of insoluble soaps in such processes as laundering, dyeing, scouring and other procedures where soap is used, especially water containing dissolved calcium and magnesium and possibly iron and manganese ions) are well known. Many methods have been suggested and used by industry for removing undesirable constituents from water supplies. One of the most successful in recent years has been the zeolite method of teatment wherein a complex sodium aluminum silicate is used in a filter bed and serves to absorb calcium and magnesium ions which are replaced by sodium ions by virtue of a process known as base-exchange. There are two serious faults of this method. First, the total solids content of the raw water is not decreased but is rather increased because of the higher equivalent weight of sodium as compared with calcium or magnesium. That is to say, for each atom of calcium or magnesium, two atoms of sodium must be exchanged which on an atomic weight basis means an increase of from 40 (calcium) or 24.3 (magnesium) to 46 (2 sodium). Second, the anions present along with the cations are not changed but appear in the effluent as they do in the raw water. In some instances this is of no consequence, but in the case of bicarbonate ions, the results of using such water as boiler-feed may be deleterious and even dangerous. As pointed out by Frederick G. Straub in "Embrittlement in Boilers," University of Illinois Engineering Experiment Station Bulletin No. 216, water containing temporary (bicarbonate) hardness which have been softened by a zeolite process produce a treated water containing sodium bicarbonate. If this water be used as boiler make-up, the sodium bicarbonate may be decomposed by the high temperatures in the boiler to sodium carbonate and eventually (to some extent, at least) to sodium hydroxide. Excessive alkalinity has been definitely shown to cause what is known as caustic-embrittlement, a condition of boiler plates and tubes leading to rupture and failure. Hence it is highly desirable to use a feed water of low sodium bicarbonate content.

The present invention overcomes both of these objections. The media of the treatment are insolubilized organic derivatives capable of ion exchange and regeneration by acid solutions, that is to say, hydrogen ions. On producing such media, initially water-soluble or partly water-soluble organic materials are rendered substantially water-insoluble by treatment with aldehydes such as formaldehyde, or by strong concentrated acids, such as sulphuric acid or the acid sludge by-product of petroleum white oil refining. The manufacture of these materials has been disclosed in detail in the aforementioned co-pending applications.

Many polyhydric phenols may be rendered quite insoluble by resinifying with formaldehyde or other aldehyde. Certain tannins such as quebracho extract or cutch, which are polyhydric phenol derivatives, may be used as an economical source of raw materials. The products have a relatively low base-exchange capacity, and are susceptible to color throwing, especially in the presence of alkaline, neutral, or slightly acid solutions. I have also noticed that on storage of the moist quebracho-formaldehyde resin, it is subjected to growth of mold which would tend to clog a filter bed, and possibly reduce the base-exchange capacity.

By using strong acids as insolubilizers, a non-color throwing and non-molding material is obtained which is resistant to attack by and regenerative by acids, and possesses a high base-exchange capacity. For example, I may take chestnut extract, quebracho extract, cutch, hemlock extract, or the raw plant products from which they are derived, or waste cellulose-sulphite liquor and add it with stirring to from 2 to 10 times its weight of an acid such as concentrated sulphuric acid (specific gravity 1.83), concentrated phosphoric acid, or sulphonic acids in the form of sludge from white oil refining. Depending on the specific materials used, the temperature, concentrations, and amount of moisture present, a reaction takes place which may liberate a sufficient amount of heat to cause a sharp rise in temperature. Agitation and a sufficiently large vessel to hold any foam produced are recommended. I prefer to keep the temperature within the limits of 60° to 120° C. and a desirable mean temperature is 80°–90° C. Any of the known methods such as artificial heating or cooling, dilution with water or other appropriate solvent, or choice of reagents or raw materials may be utilized to this end.

I prefer to so adjust the temperature concentrations, and time of reaction that the product is substantially wholly insoluble in water. If the temperature is kept too low, the product remains water-soluble; if the temperature is too high, the base-exchange capacity is reduced. At 80°–90° C. the reaction is sufficiently complete in 10 to 20 minutes. When the reaction is finished I may allow the material to cool gradually to room temperature or I may arrest the reaction by cooling, and conveniently by pouring the charge into a relatively large volume of water, this also serving to partially wash the product free of excess acid. The solids are separated by a suitable means such as filtration or decantation, and further washed if desired. Although the material may be used while still wet but washed substantially free of excess acid, I prefer to dry it, as this serves to improve the granule characteristics such as porosity and crushing strength. The freshly precipitated product is ordinarily of a variety of particle sizes. It may be crushed or ground and classified by screening, and this may take place before washing so that the latter process is facilitated; but screening may be accomplished more successfully after drying.

A suitable method of use is to place the classified material in an apparatus of the type commonly employed in zeolite water softening, but constructed of acid-resistant material, which will permit the water to run through by gravity or under pressure. The water to be treated is then led through the apparatus, and the base exchange material removes the undesirable ions, (such as the calcium, magnesium, sodium, iron, manganese ions, and bicarbonate ions, mentioned above). When the bed is exhausted it may be regenerated by running dilute acid, say 5% sulphuric acid, through it. As a concrete example, water containing calcium bicarbonate is passed through a bed of acid regenerated organic base-exchange material and the calcium ions are taken up and replaced by hydrogen ions. The carbonic acid solution formed is unstable, and carbon dioxide is given off from the solution. This may be hastened by aeration or heating, if desired. It is obvious that waters containing carbonates will act in a similar manner. The treated water thus has had its impurity (e. g., calcium bicarbonate) completely removed (both the calcium (cation) and the bicarbonate radical (anion)), and it is now safe to use as a boiler feed water because it is soft and yet contains no potential alkali. Note that when using zeolite softeners on water containing calcium bicarbonate (temporary hardness) a quite different effect is produced as above noted, i. e. the purified water contains sodium bicarbonate.

As another illustration, if water containing sodium bicarbonate such as the effluent from a zeolite apparatus which softens raw water containing bicarbonates, be treated with the organic acid-regenerated material, the sodium ions will be taken up and replaced by hydrogen ions which in turn form the unstable carbonic acid. The letter of course decomposes into water and carbon dioxide.

In some cases, the effluent will have a pH less than 4, that is, it will have some excess acid beyond the carbon dioxide present. This may be neutralized if a neutral water be desired, by adding an alkali such as sodium carbonate; or it may be passed through a sodium salt regenerated organic base-exchange material, whereupon the excess hydrogen ions are absorbed. On the other hand, it may be mixed with some of the raw water so that the acid content may be utilized to destroy some of the bicarbonate initially in the water.

Another important advantage of the present method of water treatment is in the use of the carbon dioxide-saturated effluent for "recarbonation." In softening water with lime, especially in the cold process, the reactions are sluggish and it is difficult to obtain an effluent of low non-carbonate hardness by using the theoretical amount of lime. Hence, "over-treatment" is resorted to, that is, an excess of lime is added which effectively removes the hardness, but results in the presence of calcium hydroxide in the effluent. This is objectionable especially because of after-precipitation and formation of scale deposits in pipe lines principally in hot water systems in domestic service and large buildings and also in feed water heaters for boiler installations. This has been overcome by recarbonation of the lime softened water, that is to say, the calcium hydroxide is neutralized with carbonic acid produced by supplying carbon dioxide. Present installations usually burn coke or other fuel and absorb the carbon dioxide formed in a diffuser basin or absorption tower. If it be deemed more economical to soften a given water by the lime process, it may be recarbonized by passing a water containing carbonates through an acid regenerated organic base-exchange material and combining this effluent with that from the lime process.

A very similar application might be carried out in conjunction with the known process of over-treatment with lime of fluoride-containing waters where the concentration of fluorine is sufficient to damage the tooth enamel of persons drinking the water.

The following examples are given for purposes of illustration and should not be construed to limit the invention as to proportions or scope.

*Example 1.*—One hundred parts by weight of dried hemlock sulphite liquor and 400 parts of acid sludge comprising water-soluble sulphonic acids from a white oil treating plant were thoroughly mixed and heated to 80° C. for 10 minutes. The reaction mixture was allowed to stand while spontaneously cooling for 30 minutes, when it was diluted with a large volume of water, filtered, and dried at 110° C.

The dried product was ground and screened through 20 over 40 mesh and the classified material was placed in a glass tube 2 cm. in diameter to form a column 10 cm. high. This was washed with distilled water until free of excess acid, that is, until the washings were neutral to methyl orange.

A solution of calcium bicarbonate was prepared by adding an excess of calcium carbonate to tap water and bubbling carbon dioxide through the suspension for several hours. After settling, the clear supernatant liquid was decanted off and diluted until a testing solution was obtained which had a hardness of 342 ppm. (as calcium carbonate) and a bicarbonate ion content of 0.405 mg. per cc.

This solution was passed through the column of base-exchange material at the rate of about 200 cc. per hour. The effluent was titrated with standard potassium hydroxide or hydrochloric acid and the hardness was determined by titrating with standard soap solution using the method of W. W. Scott in "Standard Methods of Chemical Analysis," 1917 edition.

A total of 1650 cc. were passed through before hardness appeared in the effluent. The water was softened to zero hardness and it had a negative bicarbonate content of 0.04 mg. per cc. By this is meant that the effluent contained sufficient excess acid (probably because of non-carbonate salts in the tap water) when titrated to the methyl orange end point so that if it were mixed with raw bicarbonate-containing water it would destroy bicarbonate ion to the extent of 0.04 mg. per cc.

The column was regenerated by passing through it 250 cc. of a 5% solution of sulphuric acid. It was again tested, this time with a water containing 406 ppm. hardness and 0.478 mg. bicarbonate ion per cc. A total of 1850 cc. of the water was softened in which the bicarbonate ion was entirely destroyed.

*Example 2.*—Four thousand parts by weight of 66.5° Bé sulphuric acid were placed in an iron kettle and 1500 parts of dried quebracho extract were gradually added with stirring. The temperature spontaneously rose to 75° C. and the kettle was cooled with running water so that the temperature of the mix was held at 73°–75° C. for 15 minutes. The batch was dumped into a large volume of water, allowed to stand 1 hour, drained off in a wire basket and further washed by playing a stream of water over the material. The material was dried at 60° C., ground, and screened through 20 on 40 mesh.

It was tested as in Example 1 with water containing 386 ppm. hardness and 0.445 mg. bicarbonate ion per cc. A total of 1950 cc. of the water were softened and reduced to zero bicarbonate content.

*Example 3.*—One hundred parts by weight of powdered quebracho extract were dissolved in 500 parts of water. The solution was diluted with 500 parts water and 200 parts 37% formaldehyde and the mixture was heated to boiling. Sixty parts of concentrated hydrochloric acid were added and the entire mass set to a soft gel which was broken up, washed with water, and dried at 50° C.

The material was tested as in Example 1, using a water containing 406 ppm. hardness and 0.478 mg. bicarbonate per cc. A total of 450 cc. were softened with elimination of bicarbonate. After regenerating with 250 cc. of 5% sulphuric acid, 500 cc. were treated before the column became exhausted.

*Example 4.*—Fifty parts by weight of dried oak leaves were mixed with 500 parts of 94% sulphuric acid. The temperature spontaneously rose to 40° C. Heat was applied and the mixture was kept at 85° C. for 10 minutes. After allowing to cool for 20 minutes, the mix was diluted with a large volume of water and the precipitate was filtered off and dried at 110° C.

The product was tested as in Example 1, and it softened 1450 cc. of a water containing 342 ppm. hardness and 0.405 mg. bicarbonate ion per cc. After regenerating with 250 cc. of 5% sulphuric acid, 1700 cc. of water containing 406 ppm. hardness and 0.478 mg. bicarbonate per cc. In each case the bicarbonate was eradicated.

*Example 5.*—The column of material from Example 1 was again regenerated with 250 cc. of 5% sulphuric acid. It was tested with a solution of sodium bicarbonate containing 0.96 mg. of bicarbonate ion per cc. The effluent was neutral to methyl orange and had a zero bicarbonate content. A total of 900 cc. of water containing the stated amount of sodium bicarbonate were treated before bicarbonate ion appeared in the effluent.

What I claim is:

1. The process of treating water containing an alkaline earth bicarbonate, which comprises passing such water through a bed of the insoluble material produced by the reactions of about 2 parts to about 10 parts of acid sludge resulting from the treatment of petroleum oil with sulphuric acid on one part of waste cellulose sulphite liquor solids, at about 60° C. to about 120° C., until the product becomes insoluble, whereby the hardness is removed and the bicarbonate ions are converted into carbonic acid which decomposes.

2. The process of treating water containing alkali metal bicarbonate which comprises passing the said water through a bed of the insoluble material produced by the reactions of about 4 parts of acid sludge resulting from the treatment of hydrocarbon oil with sulphuric acid, on one part of waste cellulose sulphite liquor solids, at about 60° C. to about 120° C., whereby the bicarbonate ions are converted into carbonic acid which decomposes, and the alkali metal ions are absorbed.

3. The process of treating water containing alkali-forming metals and containing anions of carbonic acid, which comprises passing the said water through a bed of the insoluble material produced by the reactions of about 2 parts to about 10 parts of acid sludge resulting from the treatment of petroleum oil, on one part of waste cellulose sulphite liquid solids, at about 80° C. to about 90° C., until the solid material becomes insoluble, whereby the carbonic acid anions are converted into carbonic acid which decomposes.

4. The process of treating water containing an alkaline earth bicarbonate, which comprises passing the said water through a bed of the insoluble material produced by the reactions of 2 to 10 parts of strong concentrated sulphuric acid on one part of a tannin extract, at about 60° C. to 120° C., until the solid product has become insoluble, whereby the hardness is removed and the bicarbonate ions are converted into carbonic acid.

5. The process of treating water containing an alkali metal bicarbonate, which comprises passing the said water through a bed of the material produced by the reactions of 2 to 10 parts of strong concentrated sulphuric acid on one part of a tanning extract at about 80° C. to C. until the solid reaction product has become insoluble, whereby the bicarbonate ions are converted into carbonic acid, and the alkali metal ions are absorbed.

6. The process of treating water containing alkali-forming metals and containing the carbonic acid anions, which comprises passing the said water through a bed of the insoluble material produced by the reactions of 2 to 10 parts of strong concentrated sulphuric acid on one part of a tanning extract at about 80° C. to about 90° C. until the solid reaction product has become insoluble, whereby the carbonic acid anion is converted into carbonic acid which decomposes.

7. A process of removing bicarbonate impurity from water which comprises the step of acting upon water containing a bicarbonate with a solid water-insoluble reaction product of a polyhydric phenol which has tanning properties, with several times its weight of a mineral acid.

8. A process which comprises reacting upon a substantially solid organic material having tanning properties, selected from the class consisting of quebracho extract, cutch, chestnut extract, hemlock extract, the raw plant products from which such extracts can be produced, waste cellulose-sulphite liquor solids, with several times its weight of a strong acid material selected from the group consisting of concentrated sulphuric acid, concentrated phosphoric acid, and acid sludge resulting from the treatment of petroleum oils with sulphuric acid, such reaction being effected at a temperature about 80-90° C., and continued until said organic material is insolubilized, washing said insolubilized material, to form a base exchange agent; and passing water containing a bicarbonate through a bed of such base exchange agent, whereby any alkali metals and alkaline earth metals in said water in the form of bicarbonates will be removed.

HARRY BURRELL.